May 25, 1965 G. DOUKAS ETAL 3,185,754
SCRAPING APPARATUS FOR ARC-ACETYLENE FURNACE
Filed Dec. 17, 1962 5 Sheets-Sheet 1
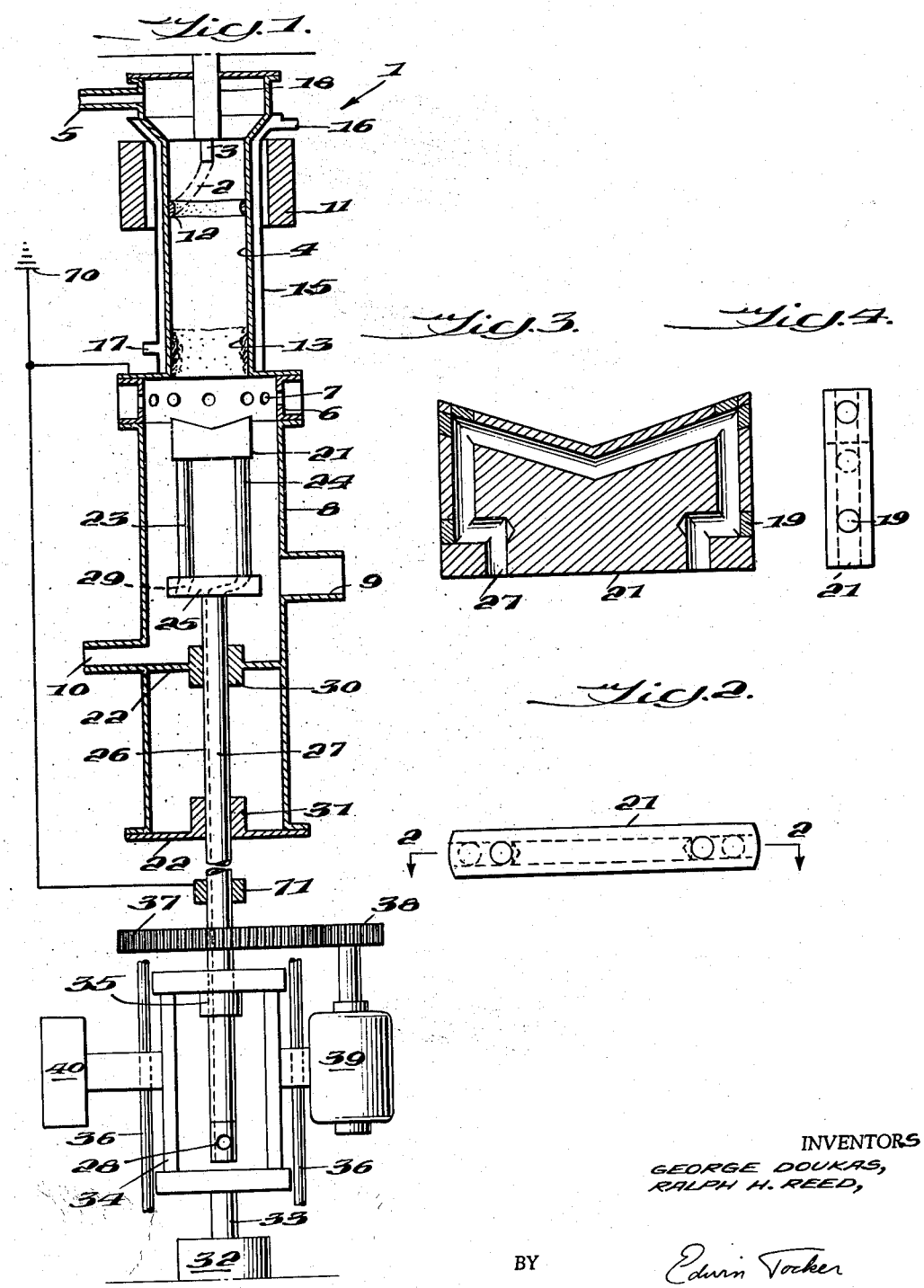
INVENTORS
GEORGE DOUKAS,
RALPH H. REED,
BY
Edwin Tocker
AGENT

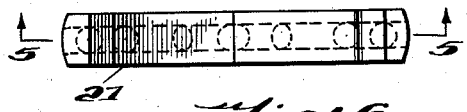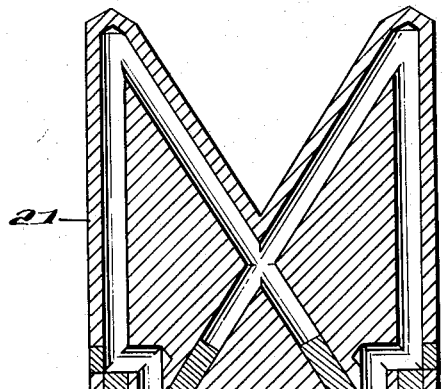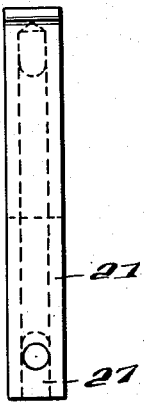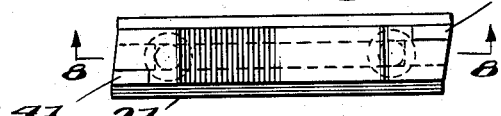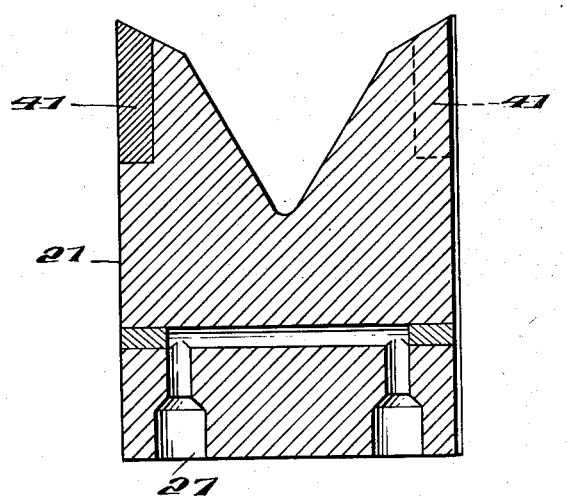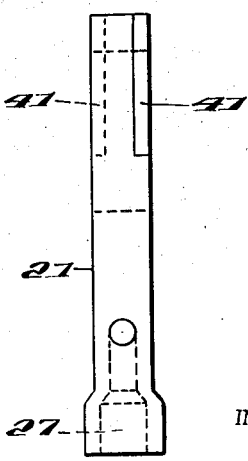

INVENTORS
GEORGE DOUKAS,
RALPH H. REED,

BY Edwin Tocker
AGENT

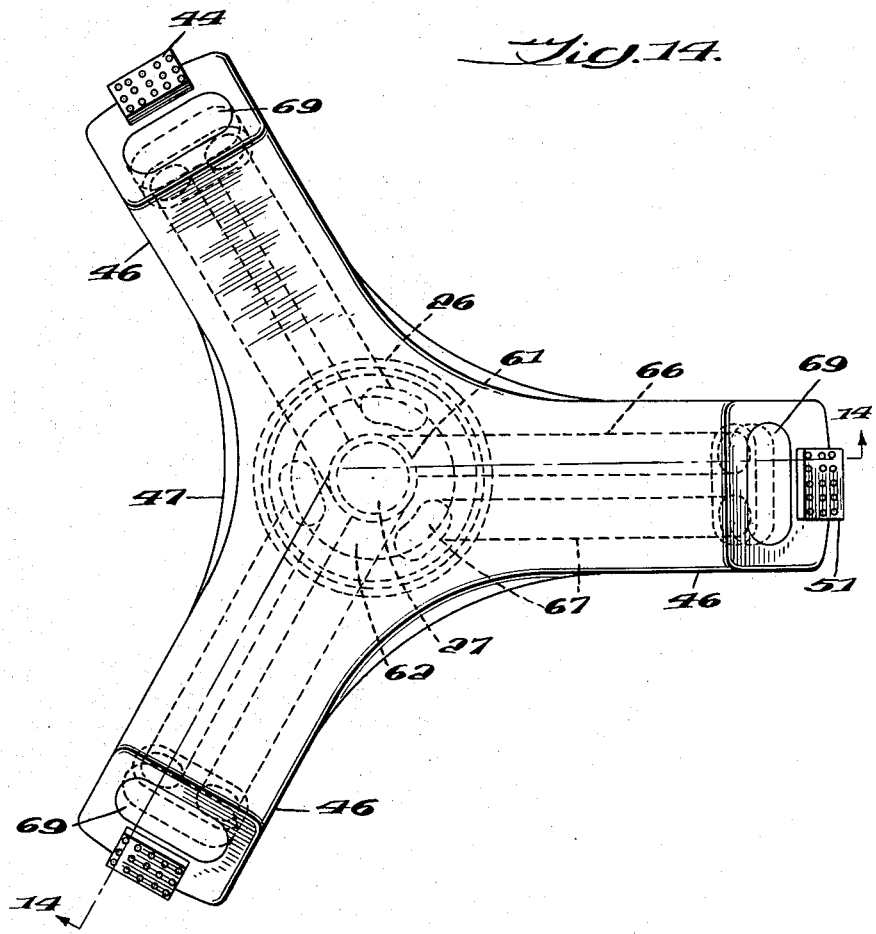

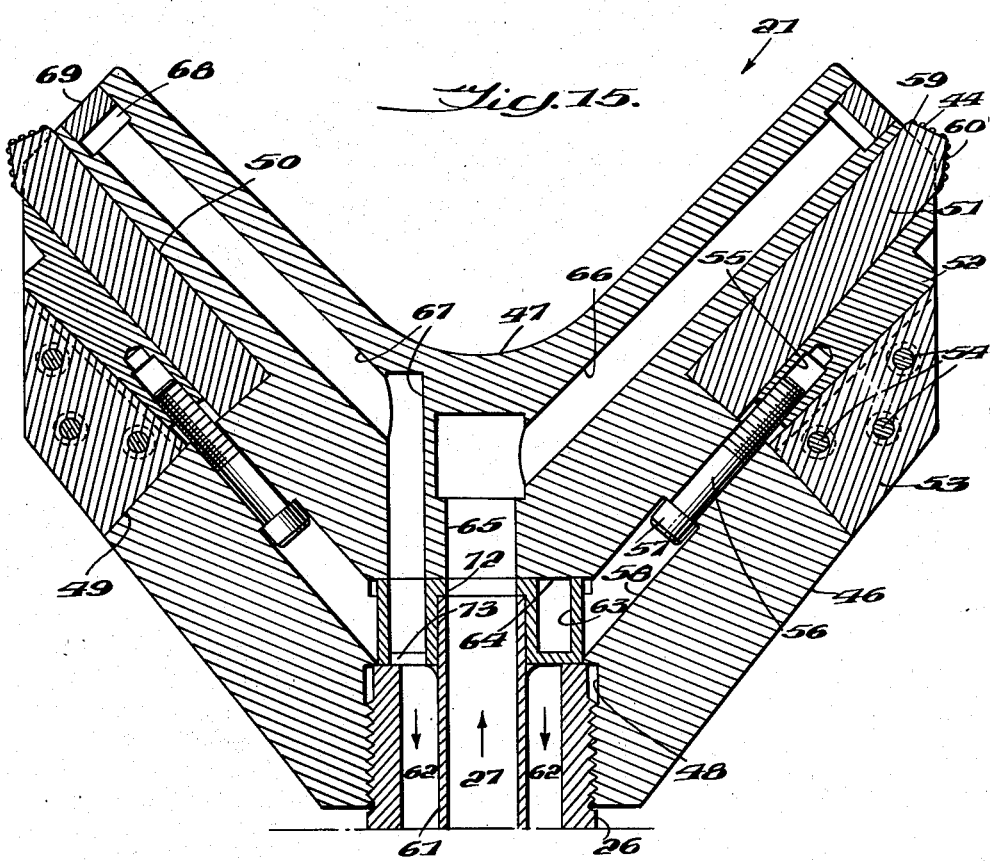
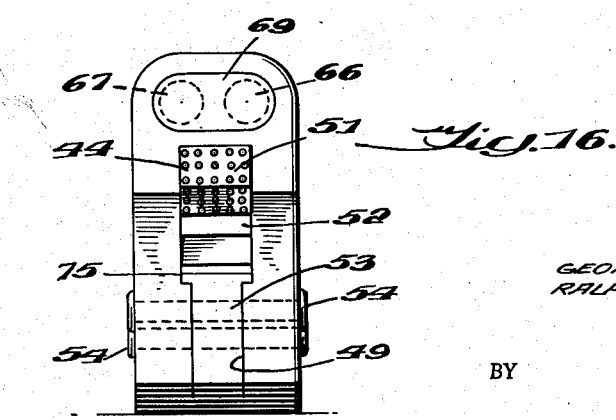

United States Patent Office 3,185,754
Patented May 25, 1965

---

3,185,754
SCRAPING APPARATUS FOR ARC-ACETYLENE FURNACE
George Doukas, Beaumont, Tex., and Ralph H. Reed, Louisville, Ky., assignors to E. I. du Pont de Nemours and Company, Wilmington, Del., a corporation of Delaware
Filed Dec. 17, 1962, Ser. No. 245,070
3 Claims. (Cl. 13—9)

This invention relates to making acetylene by passing hydrocarbons through a magnetically rotated electric arc and more particularly to an improvement in the arc furnace for carrying out this process, whereby the carbon which is deposited on an electrode which serves as a wall of the furnace is readily removed and continuous operation, without shut-downs due to accomulation of carbon, is achieved.

When acetylene is made by passing gaseous hydrocarbons through an electric arc, for example, which is struck between a central cathode and a surrounding anode in the form of a cooled metallic cylinder and the arc is rotated by means of an electromagnetic field, carbon deposits form on both anode and cathode. Although carbon formation can be greatly reduced by proper selection of the operating conditions, it is still very undesirable to have it formed even gradually and in small amounts. Thus its formation on the electrodes rapidly decreases the arc length, arc voltage, power input, and effective cross-section and consequently decreases the productivity of the vapor phase reaction. Eventually, the carbon deposits build-up so as finally either to short-circuit the arc or to close the furnace completely to the passage of gas.

The formation of carbon deposits on the cathode of the arc furnace described above can be successfully prevented by operating at certain current densities as described in U.S. patent application by George Doukas, S.N. 41,329, filed July 7, 1960, and now Patent No. 3,073,769. On the other hand, a method for preventing carbon accumulation on the anode is not known. The carbon build-up on the anode in the arc region is in the unusual form of a hard deposit which is quite adherent thereto. Loose, fluffy carbon deposits form on the anode downstream from the arc as in the usual arc vapor reaction process of the subject type. It is desirable to periodically remove both carbon formations before the accumulations of either type adversely affects furnace operation.

Ordinary mechanical removal of hard carbon deposits or their removal by chemical means, as by burning in oxygen, is impractical since it involves suspending the acetylene production and then, after removing the carbon, taking further time to re-establish and adjust the arc. Removing of the loose fluffy carbon deposit can be accomplished by brushing or occasionally by mere jarring of the anode. On the other hand, removing the hard carbon deposits mechanically while the arc is operating seemed entirely impractical, for the reasons that damage to any scraping device brought into the arc and interference of such a device with the proper functioning of the arc were both to be expected. There is a need for means to remove both types of carbon deposits from the furnace wall defining the arc chamber while the furnace is continuously operating whether said wall serves as the anode as previously described, or upon electric current reversal, as the cathode.

It is an object of the present invention to provide a means for removing carbon deposits from the surface of the electrode which defines the arc chamber in an arc furnace without interrupting continuous operation of the arc furnace.

It is an additional object of the present invention to provide a means which are intermittently operable to remove deposits from the foregoing mentioned electrode surface.

It is a further object of the present invention to provide novel apparatus including means for driving a scraper member in reciprocating and rotating fashion against carbon deposits on the wall of the arc chamber of a continuously operating arc furnace to effect removal of said deposits. Other objects will appear hereinafter.

It has been found that both hard and loose, fluffy carbon deposits can be removed from the inner wall of a cylindrically shaped electrode, serving as either anode or cathode, or an electrode of equivalent configuration, which serves to define the arc chamber in an arc furnace, without interfering with the chemical process occurring in the arc region thereof, this being accomplished by representative embodiments of the present invention depicted by the drawings in which:

FIG. 1 shows in schematic cross-section a typical arc furnace with a scraper disposed therewithin and operated by the drive mechanism of the present invention.

FIGS. 2–16 show details and interior structure of several of the many possible forms of the scraper that can be used with the drive mechanism of this invention.

Figure 11:
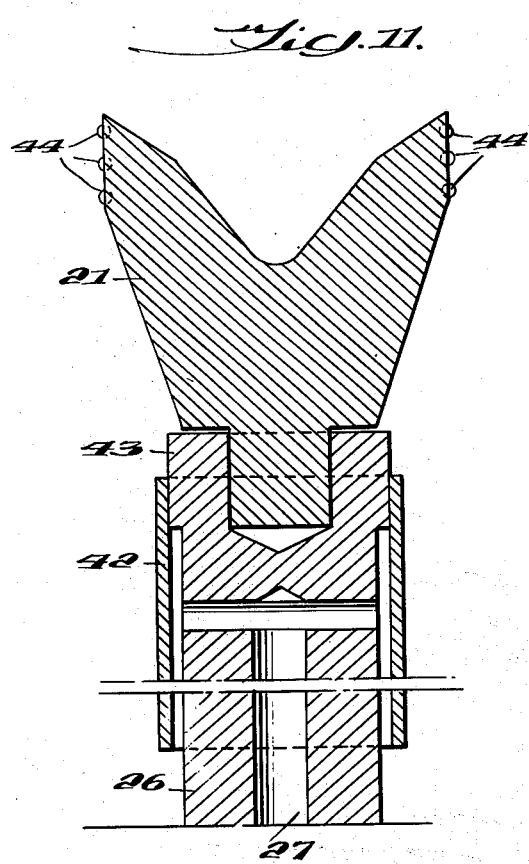

For simplicity in the description, the cylindrical electrode forming the furnace wall is taken as the anode and the central electrode as the cathode.

In FIG. 1, an arc furnace in which the drive apparatus of the present invention is conveniently operated is indicated generally as numeral 1. In the furnace, the arc 2 is struck and maintained between the central carbon cathode 3 and anode 4 the latter of which is in the form of a cylinder an axial alignment with said cathode and which forms the furnace wall or, in other words, defines the arc chamber of furnace 1. The anode is cooled by cooling jacket 15 provided with water inlet 16 and outlet 17. The cathode is protected along most of its length by shield 18 which can contain cooling coils. The gaseous feed is introduced through any suitable inlet such as through pipe 5. Located at the bottom of anode 4 is quench ring 6, from which water for quenching the gas leaving the furnace and for cooling scraping member 21 is injected through a circle of internally directed fine passages 7. The quenched gases and water pass downward through an enlarged cylindrical portion 8 of the furnace, and exit through passages 9 and 10, respectively. The electromagnet 11 with winding concentric with anode 4 and cathode 3 is adjustable at various positions vertically along the anode. The field of electromagnet 11 causes arc 2 to rotate around cathode 3 and along a path generally transverse to the length of furnace 1 over anode 4 at whichever height the electromagnet is set. The path of arc 2 over anode 4 is approximately defined by a hard carbon deposit 12 which forms in a band during the arc process. A loose, fluffy carbon deposit 13 forms on the inner wall of anode 4 downstream from arc 2.

An embodiment of apparatus for removing these carbon deposits is also shown in FIG. 1. Scraper 21, forming the lead part of this apparatus and shown in the retracted position, is mounted upon hollow tubes 23 and 24 which are, in turn, connected to yoke 25. Yoke 25 is mounted upon the end of the portion of shaft 26 which lies within the furnace. All said connections and mountings are rigid. A path through the apparatus for internal cooling water is shown in hidden view and indicated as 27. Suitable connecting means such as rotary water joint 28 at the lower end of shaft 26, opposite from the end at which the scraper is located, is provided for supplying the internal cooling water. Water entering at joint 28 is eventually discharged at outlet 29 to joint quench water from ring 6 in the lower cylindrical portion 8 of the furnace.

Shaft 26 is positioned substantially along the axis of the furnace via bearings 30 and 31 mounted upon or in compartment plates 22. This positioning is movable, i.e., shaft 26 is free to reciprocate as well as rotate within and with respect to said bearings. The reciprocating movement of shaft 26 is obtained by a driving device such as stationarily positioned pneumatic cylinder 32 having its piston 33 attached to the lower portion of frame 34. The upper portion of frame 34 is attached to thrust bearing 35 which is conventionally constructed to contain a revolvable sleeve which is, in turn, secured to shaft 26. Consequently, shaft 26 is free to rotate within the thrust bearing 35, yet, owing to its attachment to frame 34, longitudinal movement of said frame causes like movement of shaft 26. To insure alignment of frame 34 with respect to said shaft and the axis of the furnace and further to prevent the frame from rotating, longitudinal guide rails 36 are provided.

The stroke of piston 33 is desirably arranged so that in the retracted or lowest position of shaft 26, the scraper 21 connected thereto is in a position below quench ring 6 so that water therefrom may wash off the carbon accumulated on the scraper and also give it additional cooling. In the extended or upper most position of piston 33 and thus shaft 26, the scraper should be in the region of arc 2 and the hard carbon deposit.

The rotational motion of shaft 26 and thus scraper 21 is accomplished by representative means simultaneously with the reciprocating movement such as the motor and gear arrangement shown in FIG. 1. In this arrangement, the lower portion of shaft 26 is supported by thrust bearing 35 and the entire shaft is rotated through a train of reducing gears 37 and 38, the smaller gear 38 being connected to the shaft of electric motor 39. The motor 39 is counterbalanced by weight 40, both being attached to opposite sides of frame 34. Large gear 37 is attached to shaft 26 as by keying.

The scraper should have at least one scraping edge adapted ot cut or abrade away the carbon deposits 12 upon moving contact therewith. Scraper 21, shown in detail in FIG. 2 is flat in cross-section, the width thereof as viewed in FIG. 1 being slightly less than the inner diameter of anode 4. In establishing the proper clearance between the scraping edge(s) of scraper 21 and anode 4, the following factors should be among those considered: the scraping edges should be spaced wide enough apart to remove objectionable thicknesses of the carbon deposits 12 and 13; the train of apparatus, viz., shaft bearings, bearing supports, yoke, tubes, and scrapper should be preferably of sturdy enough construction so that the clearance between scraper and anode is a matter of choice rather than necessity owing to lateral movement and deflection of the above-mentioned apparatus under loaded conditions.

Scraper designs other than the scraper designs shown in FIGS. 1–16 can be employed with the driving apparatus of the present invention so long as the particular scraper used has at least one scraping edge adapted to be brought into contact with carbon deposits 12 and 13. For example, scraper 21 could be a hollow annular member (not shown) slidably fitted within anode 4 and axially coincident therewith. The cutting edge of such a scraper can be formed by beveling of the leading end thereof so as to present a sharp annular cutting edge to the carbon deposits. The effectiveness of this annular cutting edge can be increased by forming ridges or teeth therein. It has been found, however, that better results are obtained by use of the scraper designs such as hereinafter described.

Figure 12:
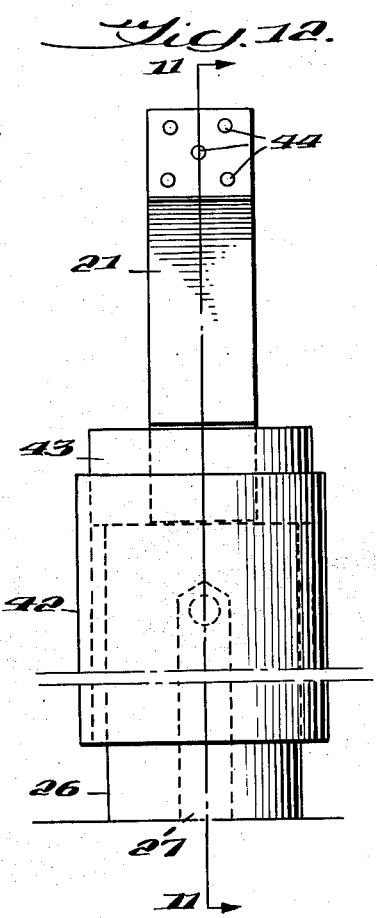
Figure 13:
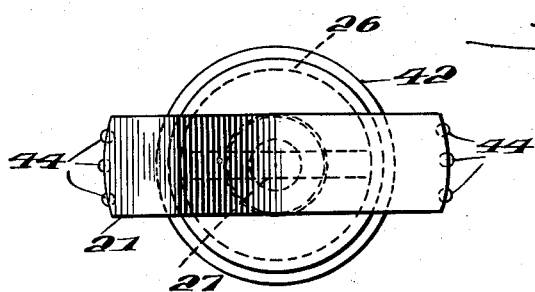

FIGS. 2–13 show various views of three representative forms of a scraper adapted to remove carbon deposits. Similar parts of each scraper are numbered identically and in accordance with FIG. 1. Generally, the scrapers of FIGS. 2–10 are made from a solid blank of metal formed externally by conventional methods and internally by drilling connecting passages indicated as 27 for cooling water and then by closing all but two of the entrances in each by screw plugs or by plug welding, indicated as 19, to form a continuous channel. The scraper of FIGS. 11–13 is a solid piece, screwed into a water-cooled block.

FIG. 2 is a bottom view and FIGS. 5 and 8 shows top views of scrapers 21 having different features of construction. FIGS. 3, 6, and 9 are side cross-sectional views taken along lines 2—2, 5—5 and 8—8, respectively, of the above figures of the same number. FIG. 3 shows the scraper as having a shallow M-shaped outline with an internal cooling passage 27 of similar shape. FIGS. 6 and 9 show the scraper in the form of a deeper M-shape, the cooling passage of the scraper of FIG. 6 being of corresponding shape while the cooling passage shown in FIG. 9 is made well to the rear of the leading edge of the scraper. FIGS. 4, 7, and 10 are end views in whole section of the scraper shown in FIGS. 3, 6, and 9, respectively.

FIGS. 11–13 show another form of a scraper which is adapted to be mounted directly upon shaft 26. The scraper 21, as shown in cross-section along line 11—11 of FIG. 12, is Y-shaped and thicker than the previously described scrapers and has its rearward end threaded to engage a female thread in boss 43 made integral with or fitted to the end of shaft 26. Cylindrical baffle 42 is fastened to the lateral side of boss 43 and extends downwardly to form an annular space between the baffle and shaft 26. There is no cooling passage for this scraper 21, the longitudinal and radial passages 27 in shaft 26 being sufficient to prevent over-heating of the scraper. Cooling water passes through the passages 27 and is deflected downwardly by baffle 42.

Several forms of scraping edge can be employed. In the scrapers of FIGS. 2 and 5, the outer or scraping sides have the curvature of the anode, and the scraper 21 is positioned within the anode so that said outer sides are parallel to it. In the scraper of FIG. 8, the sides are flat and have a rake. Optionally, the scraping edges may be formed by inserts made of cutting-tool materials, such as tungsten carbide, as by inserts 41 in the leading edge of the scraper shown in FIGS. 8–10. The abrading surface of the scraper of FIGS. 11–13, which contains industrial grade diamonds 44 projecting therefrom in a staggered relationship, is particularly useful in the apparatus of the present invention. The choice of metal used in the scraper of flat design is important, since it must combine mechanical strength at high temperature, and good electrical and thermal conductivity and must be subject to alteration and disintegration under the conditions applied. Copper does not have the required strength and hardness for scraping even when its surfaces are hardened by various treatments; steel does not have the required conductivity. Molybdenum and its alloys with titanium and zirconium have been found to be suitable. Molybdenum and its alloys are preferably also used for the anode although copper is operable. Typical molybdenum alloys contain 0.5% titanium, with or without 0.008% zirconium.

The arc furnace hereinbefore described and carbon deposit removing apparatus of the present invention are particularly useful for the continuous production of acetylene by pyrolysis of methane and higher hydrocarbons, including vaporized oils containing 12 or more carbons, in the arc. In operation, methane is introduced through pipe 5 of FIG. 1 and then passed through the rotating arc 2. As the arc process proceeds, carbon deposits accumulate at 12 and 13 on the wall of anode 4. The continuity of the arc process is gained by use of the carbon deposit removing apparatus of the present invention in which air cylinder 32 and motor 39 are simultaneously operated to cause longitudinal movement of frame 34 and the shaft-scraper assembly and coincidentally therewith, rotational movement of the shaft-scraper assembly by coaction between gears 37 and 38 driven by motor 39. Motor 39 moves longitudinally with frame 34 because of its attachment thereto but does not rotate because of longitudinal guides 36. The cutting surface of the scraper contacts the carbon deposits with a shearing force to effect removal thereof.

Many variations may be made in this furnace and carbon deposit removing equipment, some of which are connecting outlet tube 29 with a passage for removing the cooling water through the rotating shaft 26 and thence to a drain, rather than combining the effluent with the quenching effluent within the apparatus. The permits the use of a cooling medium other than water if desired. Also both gas and quenching medium can exit through passage 10. In addition, although it is usually easier to make the scrapers with two blades, it is obviously practical to make them with one, three, four, or more blades, particularly along the lines of FIGS. 9 and 11. Generically, then, scrapers to be preferably employed with the driving apparatus of the present invention can be described as comprising an axial or base portion and at least one arm or flute portion extending from the axial portion and having a scraping portion, i.e., generally longitudinal scraping surface or edge, at the outer extremity thereof.

In FIGS. 14–16 are shown a preferred embodiment of a scraper 21 in which carbon removal is accomplished by three flutes 46 extending in a substantially equi-angular relationship from a central portion or web 47 and in which provision for recirculation of the cooling medium is made. Each flute 46 has a slot 49 extending from the underside thereof to a surface, represented by line 50 of FIG. 15, which is intermediate to the thickness of the flute. Within each slot 49, is positioned scraping tool 51, a wedge 52, and a filler block 53 as best shown in cross-section in FIG. 15 (line 15—15 of FIG. 14). Filler block 53 defines the underside of slot 49 and is made stationary by rivets 54 and laterally extending flanges 75 (as best shown in the schematic end view of FIG. 16). Wedge 52 is slidably mounted within slot 49 and has a rearward tapped hole 55 to engage bolt 56, the head 57 of which abuts the shoulder of hole 58 in the flute. Wedge 52 is shorter than the depth of slot 49. As shown in FIG. 15, wedge 52 at its lower surface and filler block 53 at its upper surface have a corresponding slight taper, for example about 2°, so that tightening of bolt 56 results in an upward holding pressure exerted upon scraping tool 51. Scraping tool 51 preferably has industrial diamonds 44 embedded and projecting from its scraping surface which can have the configuration, as shown, of an upward facing portion 59 and a longitudinal facing portion 60 (with respect to the anode wall).

Web 47 has an aperture 48 which is threaded to receive a threaded portion of shaft 26. Shaft 26, as in the previous embodiments, is hollow, but here is concentrically divided by tube 61 into a cooling water supply passage 27 and a cooling water return passage 62. Tube 61 is connected to spacer 63 which is disposed between the end of the shaft 26 and a shoulder 64 within the aperture 48. Cooling water enters scraper 21 via the extension 65 of aperture 48. Flute cooling passages 66 and 67 communicate with passages 27 and 62, respectively, via a plurality of apertures 72 and an aperture 73 in spacer 63 and with each other by milled slot 68 which is capped by welded plug 69 spaced a distance from the bottom thereof. By this construction, the scraper 21 is cooled directly beneath the surface that is struck by furnace arc 2 and therefore the scraping tool 51 is kept relatively cool. It is possible to use passages 62 and 67 for cooling medium supply and passages 66, 65, and 27 as return lines.

In the embodiment of FIGS. 14–16, the scraper 21 is preferably constructed of a heat resistant but electrically conductive material such as copper-beryllium alloy. Scraping tool 51 (i.e., the body thereof) is preferably made from a molybdenum alloy. To prevent secondary arcing from occurring between scraper 21 and anode 4, shaft 26 is externally connected to anode ground 70 by a commutator arrangement shown generally at 71. To prevent possible arcing between shaft 26 and bearings 30 and 31, spacer 63 and tube 61 can be made from copper so that the anode current received by scraper 21 when struck by arc 2 will be conducted through the interior of shaft 26 to the commutator arrangement 71.

The drive apparatus of the present invention, as described previously, provides varied conditions for scraping the anode. The rotation of the scraper may be intermittent but is preferably continuous and at constant speed. The travel of the rotating scraper along the anode chamber may also be varied as required. It has been found that only a short periodic scraping in the vicinity of the point at which the arc normally strikes the anode is required. It is desirable to have the scraper move up and down the anode wall periodically rather than to rotate at a fixed level. To meet these requirements, the operation of the air cylinder may be programmed so as automatically to move the scraper through several cycles ("low scrape") in which it goes from a point at which it is washed by the quench water to a point somewhat below the point at which the arc strikes the anode and returns and to follow these cycles by a single cycle ("high scrape") in which the scraper reaches an upper point at which it removes the carbon deposit formed on the anode at the point where the arc strikes and then returns to its original position. Instead of constantly reciprocating, the apparatus can be programmed to pause with the scraper in the retracted position for predetermined time intervals. As explained above, when the scraper passes beyond the point at which the arc normally strikes the anode, the arc tends to strike the scraper instead but returns without interruption to the anode when the scraper is withdrawn. When the arc passes to the scraper, the circuit to the anode is completed mainly through direct contact between the scraper and the anode. Electrical contact is also provided by a commutator ring 71 on the lower end of the drive shaft, connected by an external cable to the ground connection 70 of the anode.

Thus, contrary to expectations and predictions, the scraper operates even in the path of the rotating arc without extinguishing it or interfering with its operation. Moreover, it is not affected by the very high temperatures developed at the point of contact with the arc. Throughout this contact with the arc as well as at other times (when it scrapes the lower part of the anode), it continues to remove the carbon deposits from the wall, without warping, melting, or disintegrating. Thus, when the driving apparatus of the present invention coupled with the preferred flat-type scraper is used in connection with the chemical process referred to above for preventing the formation of carbon on the cathode, a truly continuous production of acetylene is obtained, without interruption due to accumulation of carbon, extinction of the arc, or mechanical failure.

Although, for simplicity, the above scraping apparatus is described with the assumption that the furnace wall formed by the surrounding cylindrical electrode is the anode and the internal electrode is the cathode, the scraping apparatus also functions effectively for removing carbon from the surrounding cylindrical electrode when it is the cathode, in which case the internal electrode would be the anode.

As many apparently widely different embodiments of this invention may be made without departing from the spirit and scope thereof, it is to be understood that this invention is not limited to the specific embodiments except as defined in the appended claims.

What is claimed is:

1. In combination, an arc furnace for the pyrolysis of hydrocarbons to acetylene and having a central electrode and a surrounding coaxially aligned elongated cylindrical electrode extending down-stream from the central electrode and having an arc operating between said electrodes and rotating around the central electrode along the cvlindrical electrode in a path generally transverse to the length thereof and apparatus for removing the hard, firmly adhering carbon deposits from the arc region of the last mentioned electrode, comprising, means including a shaft movably positioned along the axis of said cylindrical electrode, means including a scraping member having a base mounted substantially at the end of said shaft, with said base having at least one flute extending therefrom and having a longitudinal scraping portion at its outer extremity adapted to make at least periodic scraping contact with said carbon deposits upon movement of said shaft, means operatively connected to said shaft to cause reciprocation thereof, and means operatively connected to said shaft to cause rotation thereof simultaneously with said reciprocation, whereby said scraping member is periodically extended to contact and remove said carbon deposits.

2. In combination, an arc furnace for the pyrolysis of hydrocarbons to acetylene and having a central electrode and a surrounding coaxially aligned elongated cylindrical electrode extending down-stream from the central electrode and having an arc operating between said electrodes and rotating around the central electrode along the cylindrical electrode in a path generally transverse to the length thereof and apparatus for removing the hard, firmly adhering carbon deposits from the arc region of the last mentioned electrode, comprising, means including a shaft movably positioned along the axis of said cylindrical electrode, means including a scraping member having a base mounted substantially at the end of said shaft, with said base having at least one flute extending therefrom and having a longitudinal scraping portion at its outer extremity adapted to make at least periodic scraping contact with said carbon deposits upon movement of said shaft, means including a frame member positioned for longitudinal movement at the opposite end of said shaft, said frame member being adapted to rotatably receive said shaft, fluid pressure means operatively connected to said frame to cause reciprocation thereof and said shaft, gear means attached to said shaft to rotate said shaft when driven, driving means including a gear attached to said frame and coacting with said gear means, said driving means being simultaneously operative with said means to cause reciprocation of said frame, whereby said scraping member is concurrently extended and rotated through said carbon deposits, and longitudinal guide means to prevent rotation of said frame member.

3. In the arc furnace of claim 2 wherein the cylindrical electrode is the anode.

References Cited by the Examiner
UNITED STATES PATENTS

| | | | |
|---|---|---|---|
| 2,345,603 | 4/44 | Houdry et al. | 15—104.1 |
| 2,805,921 | 9/57 | Schaumann | 15—104.16 |
| 3,073,769 | 1/63 | Doukas | 204—325 |

RICHARD M. WOOD, *Primary Examiner.*

JOSEPH V. TRUHE, *Examiner.*